(12) United States Patent
Gladstone et al.

(10) Patent No.: US 6,547,182 B2
(45) Date of Patent: Apr. 15, 2003

(54) SOLID ROCKET MOTOR BOLTED THRUST TAKEOUT STRUCTURE

(75) Inventors: Jeffrey D. Gladstone, Roseville, CA (US); John Mouritsen, El Dorado Hills, CA (US)

(73) Assignee: Aerojet-General Corporation, Sacramento, CA (US)

( * ) Notice: Subject to any disclaimer, the term of this patent is extended or adjusted under 35 U.S.C. 154(b) by 0 days.

(21) Appl. No.: 09/910,440

(22) Filed: Jul. 19, 2001

(65) Prior Publication Data

US 2003/0015623 A1 Jan. 23, 2003

(51) Int. Cl.[7] ................................................. B64G 1/40
(52) U.S. Cl. ............................ 244/54; 244/172; 244/58; 248/554
(58) Field of Search ........................... 244/54, 55, 172, 244/58, 137.4, 554; 60/39.31; 102/378, 377; 89/1.14, 1.57

(56) References Cited

U.S. PATENT DOCUMENTS

| | | | |
|---|---|---|---|
| 3,502,287 A | * | 3/1970 | Lindsay ........................ 244/54 |
| 3,809,340 A | | 5/1974 | Dolgy et al. |
| 4,452,412 A | | 6/1984 | von Pragenau |
| 5,131,610 A | | 7/1992 | Demange |
| 5,238,209 A | | 8/1993 | Hornyak |
| 5,297,760 A | | 3/1994 | Hart-Smith |
| 5,370,343 A | * | 12/1994 | Hornyak ...................... 244/172 |
| 5,427,248 A | * | 6/1995 | Levy et al. ................... 244/54 |
| 5,873,547 A | * | 2/1999 | Dunstan ....................... 244/54 |
| 5,979,831 A | | 11/1999 | Seaquist |
| 6,042,055 A | | 3/2000 | Messinger |

* cited by examiner

Primary Examiner—Galen L. Barefoot
(74) Attorney, Agent, or Firm—Townsend and Townsend and Crew, LLP

(57) ABSTRACT

A solid rocket motor used as a booster rocket for a launch vehicle is provided with a mounting structure that permits attachment of the rocket motor to the vehicle in a manner that accommodates the expansion that the rocket undergoes during firing without risking disengagement of the rocket due to the shear forces caused by the expansion. The mounting structure includes a raised hub to which the thrust pin is attached, a series of aft-directed struts and a pair of transverse struts, all terminating in separate plates for bolting to the rocket motor case.

12 Claims, 3 Drawing Sheets

SOLID ROCKET MOTOR BOLTED THRUST TAKEOUT STRUCTURE

This invention relates to booster rockets, and in particular to the mounting structure by which a booster rocket is secured to the side of a launch vehicle to transmit the thrust of the booster rocket to the launch vehicle.

BACKGROUND OF THE INVENTION

Launch vehicles for placing commercial and government satellites in orbit and for missions carrying heavy payloads in general are typically equipped with booster rockets to provide the initial thrust to overcome the weight of the payload or the large initial amount of fuel in the vehicle itself and to get the vehicle up to speed. One or more booster rockets are attached to the outer surface of the vehicle, and the attachment is achieved through an attachment structure that transmits the thrust from the booster rocket to the core vehicle, preferably without adding excessive weight to the rocket and vehicle. One type of attachment structure is a metal band that encircles the rocket, and the resulting rocket is known as a strap-on rocket. An alternative is a bolt-on structure, which is an external lug fitting secured by a bolt passing through the rocket motor case and into a load reaction plate located in the rocket interior. Another alternative is a wound-on structure, in which the motor case is filament-wound with a filament impregnated with resin that is cured after winding, and the lug is secured to the motor case by passing windings of the resin-impregnated filament through or over the lug and curing the resin once the windings are in place.

The attachment structure is commonly referred to as a "launch lug" or a "thrust block," and to transmit the thrust and carry the weight of the vehicle, the structure must be secure enough to withstand the stresses that are encountered during takeoff. These stresses arise both from the thrust of the booster rocket and from the expansion of the rocket caused by the increase in temperature and pressure as the rocket is being fired. Expansion of the rocket motor imposes shear forces on the bolts or other connections that are part of the attachment structure, placing the integrity of the attachment at risk. Disengagement of the booster rocket during firing results in a loss of thrust to the launch vehicle. Loosening of the attachment may cause the direction of thrust to deviate from the vehicle axis. A similar result may occur if one booster rocket becomes disengaged or loose while the others remain secure.

SUMMARY OF THE INVENTION

These and other considerations arising in connection with the attachment of a booster rocket to a launch vehicle are addressed by the present invention, which resides in a mounting structure in the form of a central support plate or hub to which a thrust pin is mounted, a series of struts extending longitudinally from one end of the plate, and a pair of struts extending laterally from the two sides of the plate. Each strut terminates in a base plate, referred to herein as a "foot," for attachment to the rocket motor case, and the struts are angled relative to the feet to raise the support plate so that the plate will not be in contact with the motor case surface when the feet are secured to the surface. The feet are joined only through the struts, leaving the feet free to spread apart or otherwise move relative to each other to accommodate stress forces exerted on the structure as the rocket motor case expands.

The mounting structure is attached to the rocket motor case with the longitudinal struts extending in the aft direction and the lateral struts (also referred to herein as "transverse" struts) extending in directions substantially perpendicular to the axis of the rocket motor. The combination of longitudinal and transverse struts and a raised support plate permits the attachment structure to expand in two directions independently, i.e., axially and circumferentially, and thereby accommodate stress forces in either direction or in both directions simultaneously. The raised central support plate and the angle formed by the two transverse struts provide the structure with the ability to accommodate circumferential expansion by allowing the angle between the struts to increase as the case circumference expands. The transverse struts are also sufficiently wide that the feeT at the ends of these struts are far apart from each other. The stress on the bolts securing the feet to the motor case will then be primarily, and in some cases entirely, a shear stress. Longitudinal expansion is accommodated by the ability of the transverse struts to move longitudinally relative to the central support plate, thereby varying the distance between the feet on the transverse struts from those on the longitudinal struts.

Other features, embodiments, and advantages of the invention will be understood from the description that follows.

DETAILED DESCRIPTION OF THE INVENTION AND PREFERRED EMBODIMENTS

Figure 1:
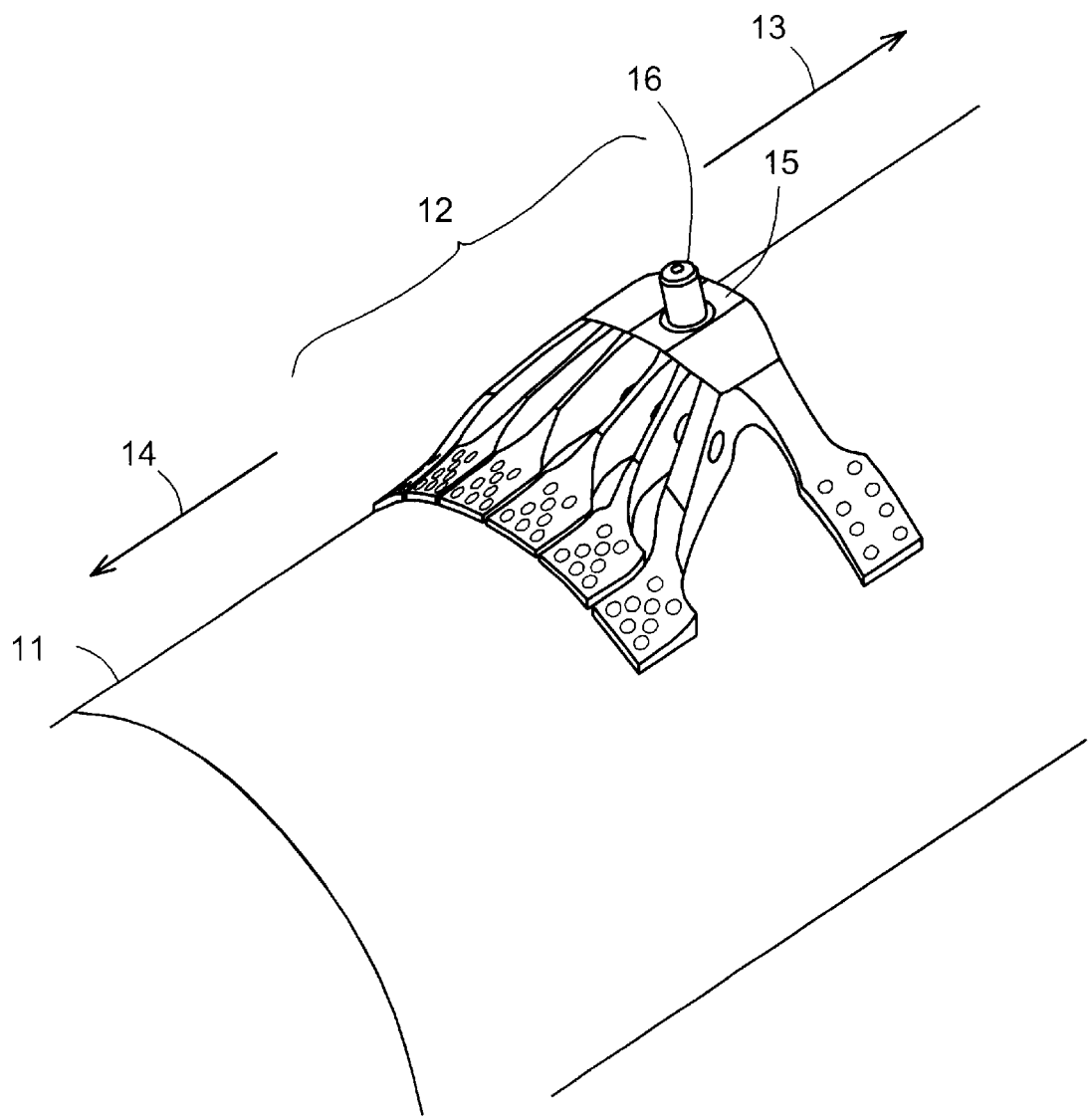
FIG. 1 is a perspective view of a booster rocket motor case and a mounting structure in accordance with the present invention.

The dimensions, shapes, configurations and other details of the mounting structure and rocket motor of the present invention will vary over a considerable range. The basic concepts of the invention will be best understood however by a detailed review of one specific example. Such an example is shown in the drawings and discussed below.

The perspective view of FIG. 1 shows the motor case 11 of a booster rocket and a mounting structure 12 secured to the motor case. The fore direction of the rocket motor is indicated by an arrow 13 and the aft direction by a second arrow 14 pointed in the opposite direction. The mounting structure 12 has a raised central platform or hub 15 serving as a support plate for a thrust pin 16 which is part of an Attach, Disconnect, and Jettison (ADJ) system by which the mounting structure 12 is mounted to the launch vehicle. Neither the launch vehicle nor the remaining elements of the ADJ system are shown in the Figure, but all are of conventional construction well known to those of routine skill in the construction of booster rockets. A typical class of launch vehicles to which this invention can be applied are Atlas vehicles. The Atlas 2AS, for example, is a booster engine stage of a multistage rocket in which the upper stage is a Centaur 2A. The Atlas stage may consist of a sustainer engine containing RP-1 rocket propellant and liquid oxygen with four solid rocket boosters attached to the engine exterior near its aft end. The mounting structure 12 of the present invention is the means by which the solid rocket booster 11 is attached to the engine exterior.

Figure 2:
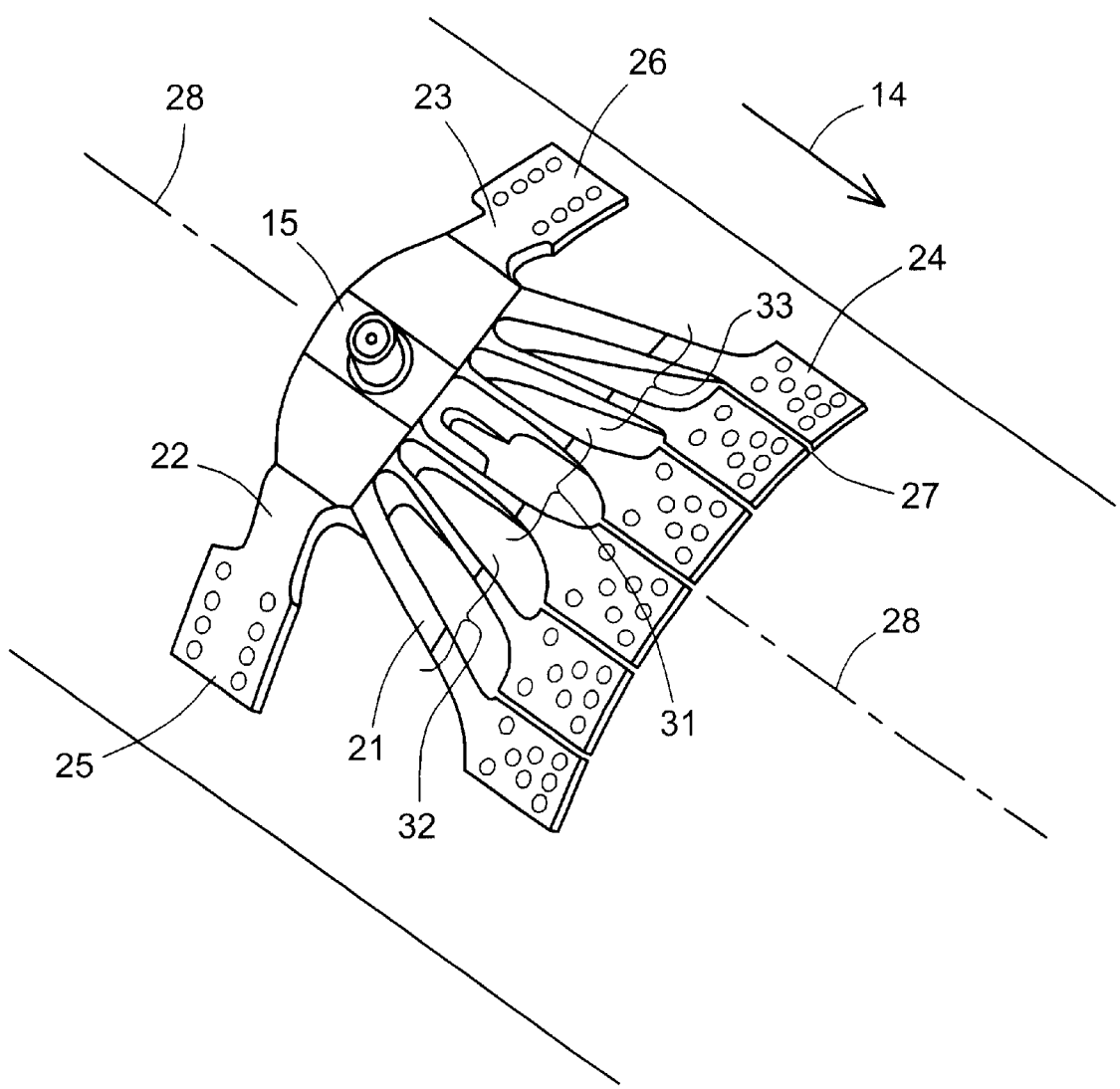
FIG. 2 is a view of the motor case and mounting structure of FIG. 1 from above to more clearly show the arrangement of the struts.

In the view shown in FIG. 2, all parts of the mounting structure are visible. Extending from the hub 15 in the aft direction 14 are an array of struts 21 referred to herein as "longitudinal struts" because they generally extend in the longitudinal or axial direction of the rocket motor. An additional pair of struts 22, 23 extend from the hub 15 in the lateral (i.e., approximately circumferential) direction, one on either of the two opposing sides of the hub. These struts 22, 23 are referred to herein as "transverse struts."

Each of the struts, both longitudinal and transverse, terminates in a separate bolting plate or "foot" 24, 25, 26 for bolting to the rocket motor case. The feet are not joined to each other, other than through the struts and the hub, and will spread apart as the motor case expands. The longitudinal struts serve primarily to absorb and transmit the thrust forces. The transverse struts 22, 23 serve to absorb and transmit lateral forces, including stabilizing the mounting structure against the forces arising during thrust. Accommodation for circumferential expansion is also provided by the longitudinal struts by since the unconnected feet will spread apart as the circumference increases, each foot still maintaining secure bolt connections to the motor case. To achieve a secure attachment of the feet to the motor case, the feet are curved so that their undersides collectively define a curved surface that follows the curvature or contour of the motor case.

Referring again to FIG. 1, each of the struts 21, 22, 23 forms an obtuse angle with its associated foot, thereby raising the hub 15 relative to the feet and displacing the hub outward from the motor case surface. This places the transverse struts at an angle to each other, thereby allowing them to accommodate circumferential expansion by permitting the angle to increase. When the transverse struts are in a non-stressed condition, a preferred range for the angle between them is from about 80 degrees to about 100 degrees. Using the axis of the thrust pin 16 as a reference, the angle between each transverse strut and the thrust pin is thus within the range of from about 40 degrees to about 50 degrees. A presently preferred angle (relative to the thrust pin axis) is about 43 degrees to about 45 degrees. This angle increases when the pressure in the rocket motor rises enough to cause expansion of the motor case.

Six longitudinal struts are shown in these figures, but the number may vary and is not critical to this invention. The mounting structure in these figures is symmetrical about a center line 28 (shown in FIG. 2), which is parallel to the axis of the rocket motor. Longitudinal struts that are parallel to the center line 28 will be the most effective in absorbing the thrust of the rocket. A more secure attachment of the mounting structure to the rocket may be achieved by including a series of longitudinal struts spread out over the curvature of the rocket surface. Thus, in certain embodiments of the invention, such as the embodiment shown in the figures, the longitudinal struts will form a fan-like arrangement from the raised hub 15. The structure may therefore include four or more longitudinal struts, and in some cases six or more, symmetrically arranged on either side of the center line. In general, however, it is preferred that at least two of the longitudinal struts will be parallel to the center line 28.

A fan-like strut arrangement will be beneficial when the number of feet and the total number of bolts are great enough to require the feet to span a large area. Each bolt must be strong enough (i.e., of sufficient diameter) to withstand the loads encountered during thrust, and the spacing between adjacent bolts must be great enough to allow a secure attachment of each bolt to the motor case. While the bolt diameters and spacings can vary and the invention is not limited in this regard, a typical ratio of bolt spacing to bolt diameter is approximately 4:1. For any ratio, however, the need to accommodate a sufficient number of bolts to form a secure connection will often result in feet that collectively span an area of the motor case that considerably exceeds the dimensions of the hub, hence the fan-like configuration.

In mounting structures of the invention which include a fan-like arrangement of longitudinal struts, the outer struts 32, 33 (FIG. 2), which diverge from the center line, may be thicker than the central struts 31. The thickness may increase from one strut to the next as the angle of the strut relative to the thrust direction (i.e., the center line) increases. The gradation in thickness will help divide the load between all of the longitudinal struts, since the central struts 31 would otherwise carry the major portion of the load.

Figure 3:
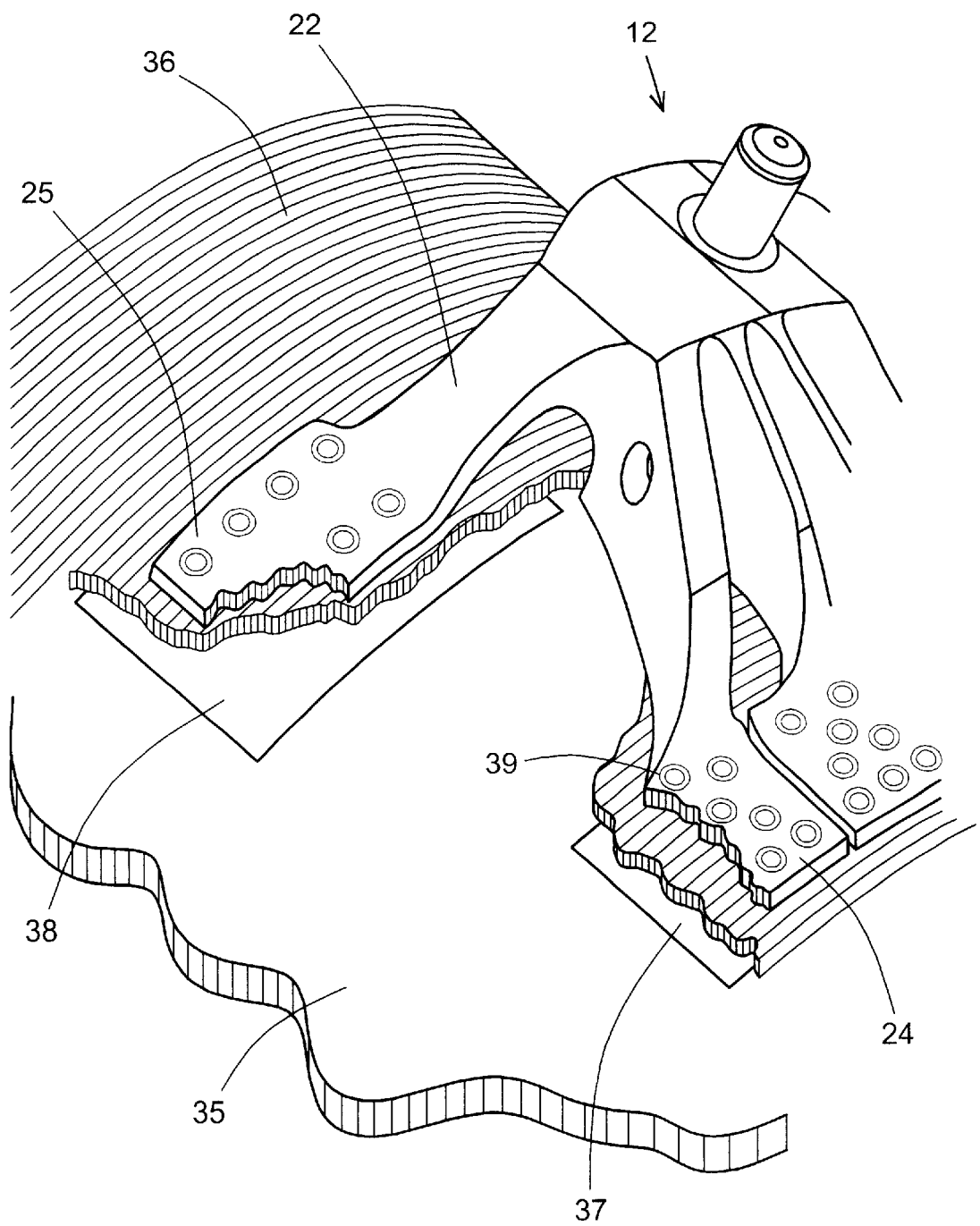
FIG. 3 is a cutaway view of the motor case and mounting structure of FIGS. 1 and 2 to show the means by which the mounting structure is secured to the motor case.

The means of attachment of the mounting structure 12 to the motor case is shown in the cutaway view of FIG. 3. The motor case in this example is a composite motor case whose outer shell is a filament-wound fiber-resin composite casing formed by winding resin-impregnated filament over a mandrel. The filament is carbon or glass fiber, or a combination of both, and the resin is typically polyester or epoxy resin. A common example is an epoxy resin based on diglycidyl ether-bisphenol A, cured in place after the winding has been done. Filament winding is typically done in layers with the orientation of the winding differing from one layer to the next. An insulating liner of a material such as rubber is generally included beneath the fiber-wound shell. The cutaway view of FIG. 3 shows the liner 35 and a filament winding layer 36 over the liner. The feet 24, 25 of the mounting structure contact the outer surface of the filament winding layer 36. Portions of the liner 35 are either cut away or recessed to receive mounting plates 37, 38, with one such plate for each foot. The filament winding 36 extends over the mounting plates, thereby securing them rigidly to the motor case. Bolts 39 pass through the filament windings to secure each foot to the underlying embedded mounting plate 37, 38.

The mounting plates 37 for the longitudinal struts may be discrete individual plates, one for the foot of each longitudinal strut, or they may be a series of plates joined together by a thin web or connecting ligament of the same material. The inclusion of such a web or ligament serves as an assembly aid to hold these plates in alignment as they are being affixed to the motor case during filament winding. The web or ligament is thin enough however that once it has served its alignment function during the assembly stage, it will either stretch or break during expansion of the motor case, thereby permitting the feet to spread apart to accommodate the expansion. A similar thin web may also join the mounting plates of the transverse struts either with each other or with the mounting plates of the longitudinal struts.

The ability of the mounting structure to withstand stresses will be greatest when the loads on the bolts are shear stresses, with as little stress as possible in the direction along the axis of the bolt. For the transverse struts and their associated feet, this can be accomplished by positioning the feet widely so that they span a large arc of the circumference of the outer surface of the rocket motor. In preferred embodiments, this arc is from about 75 degrees to about 100 degrees, and most preferably about 90 degrees. For the longitudinal struts, a similar result is achieved by using struts of sufficient length. In preferred embodiments, this length, expressed as a fraction of the diameter of the rocket motor case, is from about 0.25 to about 0.40 times the diameter.

While the invention is not limited to particular dimensions or angles, one presently preferred example of a mounting structure within the scope of the invention is a mounting structure for a motor case that is 60 inches (152 cm) in diameter, the structure having six longitudinal struts, each strut being 18 inches to 20 inches (46–51 cm) in length, including two struts in the center that are parallel to the center line and two on either side that diverge outward. The central struts are each 1 inch (2.5 cm) in thickness, the intermediate struts are each 1.5 inches (3.6 cm) in thickness, and the outermost struts are each 2 inches (5.1 cm) in thickness. The transverse struts form an angle of 45 degrees with the axis of the thrust pin, and the feet on the transverse struts span an arc that is one-fourth the circumference of the rocket motor.

The foregoing description focuses on particular embodiments of the invention for purposes of explanation and illustration. Further embodiments and modifications that still fall within the scope of the invention will be apparent to those skilled in the art.

What is claimed is:

1. A mounting structure for securing a rocket motor to a core vehicle, said rocket motor having an outer surface of a predetermined contour and an axis defined by a thrust direction, said mounting structure comprising:
    a support plate with a thrust pin mounted thereto;
    a plurality of longitudinal struts extending from one end of said support plate;
    a pair of transverse struts extending from opposing sides of said support plate;
    said longitudinal and transverse struts terminating in feet with undersurfaces that collectively define a contour complementary to said predetermined contour of said rocket motor outer surface, said struts being angled relative to said feet such that said support plate is raised relative to said feet; and
    means for securing said feet individually to said rocket motor such that said longitudinal struts are aligned approximately along said thrust direction.

2. A mounting structure in accordance with claim 1 in which said rocket motor has a longitudinal axis and said mounting structure has a center line that is parallel to said longitudinal axis when said mounting structure is secured to said rocket motor, and in which two of said longitudinal struts are parallel to said center line and positioned on opposing sides thereof.

3. A mounting structure in accordance with claim 1 in which said transverse struts form an angle of from about 80 degrees to about 100 degrees with each other.

4. A mounting structure in accordance with claim 1 in which said rocket motor is circular in cross section and said longitudinal struts are each of a length ranging from about 0.25 to about 0.40 of the diameter of said rocket motor.

5. A mounting structure in accordance with claim 1 in which said feet at the termini of said transverse struts define an arc of a circle, said arc ranging from about 75 degrees to about 100 degrees.

6. A mounting structure in accordance with claim 2 in which said parallel struts are defined as central struts and said plurality of longitudinal struts further comprises outer struts diverging from said central struts in a fan-like configuration, and said outer struts are thicker than said central struts.

7. A mounting structure in accordance with claim 1 in which said means for securing said feet to said rocket motor comprise a plurality of plates embedded in the wall of said rocket motor, a separate such plate for each said foot.

8. A solid rocket motor attachable to a core vehicle, said solid rocket motor comprising:
    solid propellant encased in a rocket motor case having a cylindrical outer surface of a predetermined contour and an axis defined by a thrust direction; and
    a mounting structure for securing said rocket motor case to said core vehicle, said mounting structure comprising:
        a support plate with a thrust pin mounted thereto;
        a plurality of longitudinal struts extending from one end of said support plate;
        a pair of transverse struts extending from opposing sides of said support plate;
        said longitudinal and transverse struts terminating in feet with undersurfaces that collectively define a contour complementary to said predetermined contour of said rocket motor outer surface, said feet being individually secured to said rocket motor case such that said longitudinal struts are aligned approximately along said thrust direction, and said struts being angled relative to said feet such that said support plate is raised relative to said rocket motor outer surface.

9. A solid rocket motor in accordance with claim 8 in which said rocket motor case is a composite case comprising filament wound over an insulating layer.

10. A solid rocket motor in accordance with claim 9 in which said feet are secured to said rocket motor case by being bolted to plates embedded in said insulating layer.

11. A solid rocket motor in accordance with claim 8 in which said transverse struts form an angle of from about 40 degrees to about 50 degrees with each other.

12. A solid rocket motor in accordance with claim 8 in which said rocket motor is of circular cross section and said feet at the termini of said transverse struts define an arc of said circle, said arc ranging from about 75 degrees to about 100 degrees.

* * * * *